United States Patent [19]

Campbell

[11] Patent Number: 5,277,054
[45] Date of Patent: Jan. 11, 1994

[54] APPARATUS FOR IN-SITU CALIBRATION OF INSTRUMENTS THAT MEASURE FLUID DEPTH

[75] Inventor: Melvin D. Campbell, Richland, Wash.

[73] Assignee: Battelle Memorial Institute, Richland, Wash.

[21] Appl. No.: 813,339

[22] Filed: Dec. 23, 1991

[51] Int. Cl.⁵ .................. G01F 25/00; G01F 23/18
[52] U.S. Cl. ............................. 73/1 H; 73/300
[58] Field of Search ............ 73/1H; 73/2, 99-303

[56] References Cited

U.S. PATENT DOCUMENTS 4,843,883  7/1985  Glover et al. ............... 73/1 H X

FOREIGN PATENT DOCUMENTS 40736    4/1981  Japan ..................... 73/1 H
179713  11/1982  Japan ..................... 73/1 H
509784   9/1976  U.S.S.R. ................. 73/1 H

*Primary Examiner*—Tom Noland
*Attorney, Agent, or Firm*—Paul W. Zimmerman

[57] ABSTRACT

The present invention provides a method and apparatus for in-situ calibration of distance measuring equipment. The method comprises obtaining a first distance measurement in a first location, then obtaining at least one other distance measurement in at least one other location of a precisely known distance from the first location, and calculating a calibration constant. The method is applied specifically to calculating a calibration constant for obtaining fluid level and embodied in an apparatus using a pressure transducer and a spacer of precisely known length. The calibration constant is used to calculate the depth of a fluid from subsequent single pressure measurements at any submerged position.

11 Claims, 6 Drawing Sheets 5,277,054

APPARATUS FOR IN-SITU CALIBRATION OF INSTRUMENTS THAT MEASURE FLUID DEPTH

This invention was made with Government support under Contract DE-AC06-76RLO 1830 awarded by the U.S. Department of Energy. The Government has certain rights in the invention.

FIELD OF THE INVENTION

The present invention relates generally to a method and apparatus for in-situ calibration of instruments to measure pressure, liquid depth, displacement, and surface elevation.

The present invention is applicable to other distance measuring devices including but not limited to sonic, and optical transducers.

BACKGROUND OF THE INVENTION

Calibration of distance measuring equipment is generally done in a laboratory by comparison to a standard. Since field conditions are usually different from laboratory conditions, measurements may be in error because of the effects of the field conditions on the equipment. Often, correction factors may be applied, but just as often, there are uncorrectable variations in measurements. Moreover, equipment drifts with time and requires periodic recalibration to maintain its accuracy. Equipment is occasionally subjected to conditions outside the calibrated range but within the physical capacity of the equipment to resist damage. It would, therefore, be advantageous to perform calibration in-situ and without comparison to a standard for correction of drift and confirmation of calibration after over-ranging events.

Another aspect of laboratory calibration techniques is data reduction. Data collected in one set of units, for example electrical signal units such as volts or amps, must be multiplied by physical constants in another set of units, for example gravity or density, to obtain the final result. It would be advantageous to reduce the number of unit conversions required to reduce data collected for calibration and measurements.

Distance measurements are performed to determine fluid level using instruments including but not limited to, optical level detectors, electric resistance level detectors, sonic level detectors, radiofrequency level detectors, and pressure transducers. Distance measurements are made during surveying, for example with a theodolite instument, and while navigating, for example, with a sextant instument.

Improved accuracy of distance measurements is increasing in importance. For example, new requirements in environmental monitoring require measuring water depth in a well within 0.01 ft. Other applications that would benefit from highly accurate determinations of fluid level include but are not limited to gasoline storage tanks, food oil storage tanks, and chemical process tanks.

Establishing accuracy requires making many measurements in order to increase statistical confidence. By reducing the number of unit conversions as well as the number of physical operations necessary to obtain measurements, the requisite number of measurements for a particular confidence level may be made at a reduced cost.

Of the prior methods and apparati for measuring liquid level, none was found to provide in-situ calibration of the equipment. In the case where fluid level is determined using pressure transducers, it was found that all pressure transducers are subject to drift which requires correction by frequent calibration. Since calibrations are generally done at conditions different from the conditions under which measurements are obtained, this introduces a component of error or uncertainty that is difficult and expensive to overcome.

It would be advantageous to have a method and apparatus of in-situ calibration of distance measuring equipment to reduce the uncertainty of measurements without comparison to a standard, and to reduce the cost of obtaining the measurements. In particular, for measuring fluid level in wells, it would be advantageous to have a method and apparatus of in-situ calibration that would fit in most water wells and tanks and not require removal of the equipment from a well or comparison to a standard.

SUMMARY OF THE INVENTION

The present invention provides a method and apparatus for accurately and precisely calibrating instruments in-situ or under actual field conditions. The method and apparatus of the present invention provide a calibration factor which, when multiplied by subsequent data, provides a distance in appropriate units, for example feet or meters, without further unit conversion or multiplication to other physical constants. In cases wherein the distance measuring device has a non-linear response or a linear response that is shifted due to an over-ranging event, in-situ calibration at measurement conditions provides an accurate new calibration constant.

The method comprises making a first distance measurement at a first location, then making at least a second distance measurement in at least a second location having a precisely known displacement from the first location. The movement between first and second locations may be manual or automatic. The measurements are used together with the known precise displacement to obtain a calibration constant. Specifically, the known displacement is divided by a difference of distance measurements made at the first and second locations.

An apparatus of the invention for measuring fluid level comprises a pressure transducer attached to a displacement device. The pressure transducer may be any type having a range within the fluid level of interest.

The displacement device moves over a selected precise vertical displacement within the range of the pressure transducer and within the fluid column of interest. For practical purposes in recalibrating a pressure transducer in a water well, a vertical displacement of about 0.3 m (1 ft) ±0.0008 m (0.0025 ft) will yield a calibration wherein the error or uncertainty of the displacement is negligible compared to the error or uncertainty of the pressure transducer. Valid calibrations and measurements within ± 0.003 m (0.01 ft) are possible depending upon the selection of the pressure transducer. The magnitude of the displacement is not important so long as the displacement magnitude and displacement accuracy combine to contribute an uncertainty that is negligibly small compared to the uncertainty of the pressure transducer. A negligible displacement uncertainty will be achieved when the displacement magnitude is great enough to produce a transducer response several times greater than the transducer uncertainty, and when the displacement accuracy is at least four times as precise as the specified distance accuracy which, in the case of new standards for water well measurements is ± 0.003 m (± 0.01 ft.).

For other applications including but not limited to finding the fluid level in a tank, vertical displacements greater than 0.3 m (1 ft) may be preferred.

The operation of the fluid level measuring apparatus comprises obtaining a first pressure measurement at a first submerged location, then obtaining at least one other pressure measurement in at least one other submerged location that is separated by a precise vertical displacement from the first submerged location. The vertical displacement divided by the change or difference in transducer pressure measurements yields a calibration constant. An unsubmerged pressure measurement may be obtained to determine an offset value. The calibration factor and offset value may be combined with a single pressure measurement at any submerged position to determine precisely and accurately the depth of fluid above the position of the single pressure measurement.

Other fluid level measuring equipment including but not limited to sonic level detectors, optical level detectors, and radiofrequency level detectors, whether above or below the fluid level, may be calibrated in the same manner as the pressure transducer.

The advantages of the present invention over prior methods are: (1) the measurement equipment is calibrated within the environment and at the time which measurements are made thereby eliminating the need for temperature compensation and other corrections, (2) the calibration procedure is independent of the calibration curve of a particular measurement device, (3) the invention is accurate and precise over a long-term period, and (4) the invention is inexpensive to construct and operate.

The subject matter of the present invention is particularly pointed out and distinctly claimed in the concluding portion of this specification. However, both the organization and method of operation, together with further advantages thereof, may best be understood by reference to the following description taken in connection with accompanying drawings wherein like reference characters refer to like elements.

DESCRIPTION OF THE PREFERRED EMBODIMENT(s)

The present invention relates generally to a method and apparatus for in-situ calibration of instruments to measure pressure, liquid depth, displacement, and surface elevation.

Figure 1:
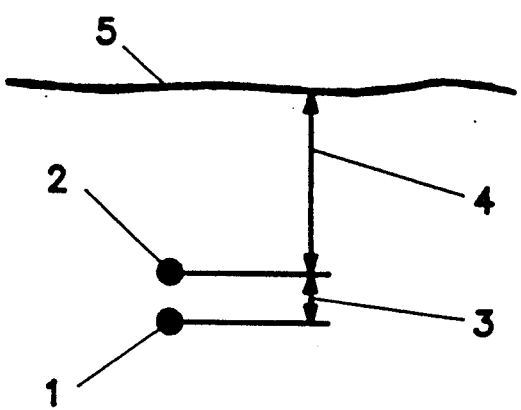
FIG. 1 is a diagram of positions relative to a fluid surface.

The method of the invention can be understood with reference to FIG. 1. In a fluid of constant density, the method comprises obtaining a first pressure measurement at a first submerged location (1) then obtaining a second pressure measurement at a second submerged location (2) that is separated by a precise vertical distance (3) from the first submerged location (1). A third pressure measurement is obtained in an unsubmerged location to determine an offset value. The first and second pressure measurements are used with the vertical distance (3) to obtain a calibration constant that may be combined with the unsubmerged pressure measurement to determine precisely and accurately the depth of fluid (4) above any submerged position.

The procedure may be generalized to include calibration of any fluid level or distance-measuring device. For example, a sonic level detector used above the fluid level may be used to obtain readings separated by a precisely known distance to obtain a calibration constant. Of course, a calibration constant for a sonic-level detector will be different from a calibration constant for a pressure transducer.

In the case of fluid-level determination through the use of a pressure transducer, the method is based on the theory of fluid statics. The forces acting are gravity and pressure, where gravity is constant and pressure is determined by a distance below a fluid surface (5). Since the fluid is static, there are no shear forces and viscosity is not a consideration. However, the ability of a fluid to "wet" a pressure transducer may be a consideration.

The equation for finding a pressure at any submerged position is $$\int dp = -\int \rho g dy \qquad (1)$$

where
P = pressure (MPa) (psi)
Δ = density (kg/m$^3$)(lbm/ft$^3$)
g = acceleration of gravity (9.8 m/S$^2$)(32.2 ft/s$^2$)

In the case of constant density, Equation 1 may be integrated to obtain $$(P_1 - P_5) = -\rho g (Y_1 - Y_5) \qquad (2)$$

where
P$_1$ = pressure at submerged location (1) (FIG. 1)
P$_5$ = atmospheric pressure at a fluid surface (5) (FIG. 1)
(Y$_1$Y$_5$ = depth (4) from fluid surface (5) to submerged location (1) (FIG. 1)

Writing Equation 2 for the first submerged location (1) and the second submerged location (2) and recognizing that the pressure at the surface (5) is the same in both equations, the equations may be combined as $$\rho g = \frac{P_1 - P_2}{Y_2 - Y_1} \qquad (3)$$

P$_1$ = pressure at submerged location 1 (FIG. 1
P$_2$ = pressure at submerged location 2 (FIG. 1)

$(Y_2 - Y_1)$ = distance (3) between submerged locations 1 and 2 (FIG. 1)

By measuring the pressures at the two submerged locations and by precisely knowing the vertical distance (3) between them, the calibration constant $\Delta$ is obtained. It may be convenient to use the reciprocal of $\Delta$ as a calibration constant so that readings are multiplied by a calibration constant as a factor rather than divided by a calibration constant as a divisor. A third measurement of pressure unsubmerged is also made. Combining the calibration constant with the unsubmerged pressure measurement ($P_5$) into equation 2, and solving for the displacement difference, the depth (4) is obtained in the following equation;

$$(Y_1 - Y_5) = \text{depth}(4) = -(P_1 - P_5) * C \quad (4)$$

where C is a calibration factor which is the reciprocal of $\rho g$

In cases where the unsubmerged pressure measurement is negligible compared with a submerged pressure measurement, the two submerged pressure measurements may be used to determine the depth (4).

A change in depth may be obtained from a difference of pressure measurements taken at the same absolute location multiplied by the calibration constant factor.

Measurements may be verified by a second means such as a graduated tape.

Once a calibration constant is obtained, single pressure measurements may be used to periodically determine depth (4). Single pressure measurements taken at short time intervals may be used to monitor a continuously changing fluid level; for example, while a tank is emptied or filled. Since pressure transducer readings may change due to drift, over-ranging events or other circumstances, the present invention permits recalculation of the calibration constant at any time, in-situ.

EXAMPLE 1

Experiments were conducted to test the in-situ calibration procedure for determining the level of a fluid in a well according to the method of the present invention. Water wells were used wherein the water was assumed to have a constant density as a function of time and depth.

The pressure measurements were obtained with a quartz crystal pressure transducer having an accuracy of 0.5% over a 0.07 MPa (1.0 psi) range. The pressure transducer was connected to a data logger having a resolution of 0.000165 millivolt (mV).

The vertical displacement of 0.1524 m (0.5000 ft.) was measured with a micrometer having an uncertainty or accuracy of plus or minus 2.54(10−6)m (8.33(10−6)ft.). Six pressure transducers were mounted on the displacement device and measurements taken just under the water surface, 0.5 ft. below the water surface, 1.0 ft., 1.5, ft., 2.0 ft. and 2.5 ft. depths. Measurements were made at these depths both in descending and ascending order.

Figure 2:
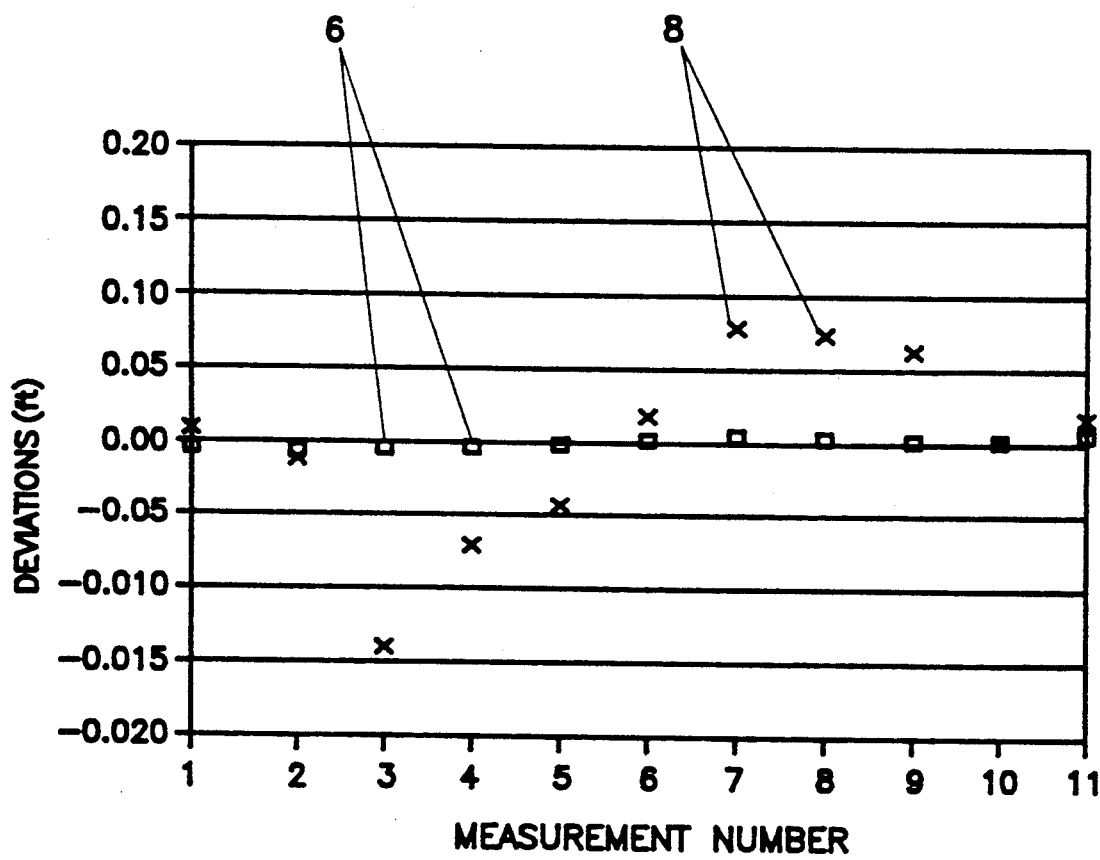
FIG. 2 is a chart showing deviations of transducer readings from standard values during calibration.

The differences between the micrometer indicator readings and the pressure transducer measurements provide an indication of the overall uncertainty of the method. FIG. 2 shows the differences plotted for two of the six transducers. The transducer having results represented with boxes (6) in FIG. 2 has an accuracy well within 0.005 ft. while the transducer with results represented by "X's" (8) is within 0.015 ft.

In the previous discussion and example, the fluid was of constant density. In the case of variable density, there is continuously variable density and discontinuously varying density. Examples of continuously varying density include but are not limited to a column of fluid having a thermal gradient, and the density of the fluid is a function of temperature, a compressible fluid, and a mixed two-phase fluid. An example of discontinuously varying density includes but is not limited to oil on water.

In the case of a continuously varying density, the density may be described mathematically as a function of depth. This introduces higher order terms into the equation resulting from integrating equation 1. The method of obtaining depth for a constant density fluid may be applied with the modification that more than two submerged pressure measurements are made at precisely known vertical displacements. These measurements in conjunction with equations written for each of the submerged locations gives a system of "n" equations having "n" unknowns from which the depth may be calculated.

In the case of discontinuously varying density, measurements of pressure of at least three separate depths in each density layer are required to locate the interfaces between density layers.

In cases wherein surface waves would significantly affect the determination of fluid level, frequent measurements over a full wavelength are necessary to obtain an integrated calibration constant. Subsequent measurements may then be made as infrequent as 4 times the period.

Where floating material is present, it has no effect on the calibration method. However, if fluid depth is used to determine fluid volume or mass, then floating material must be taken into consideration. Accounting for floating material is beyond the scope of this method.

Figure 3:
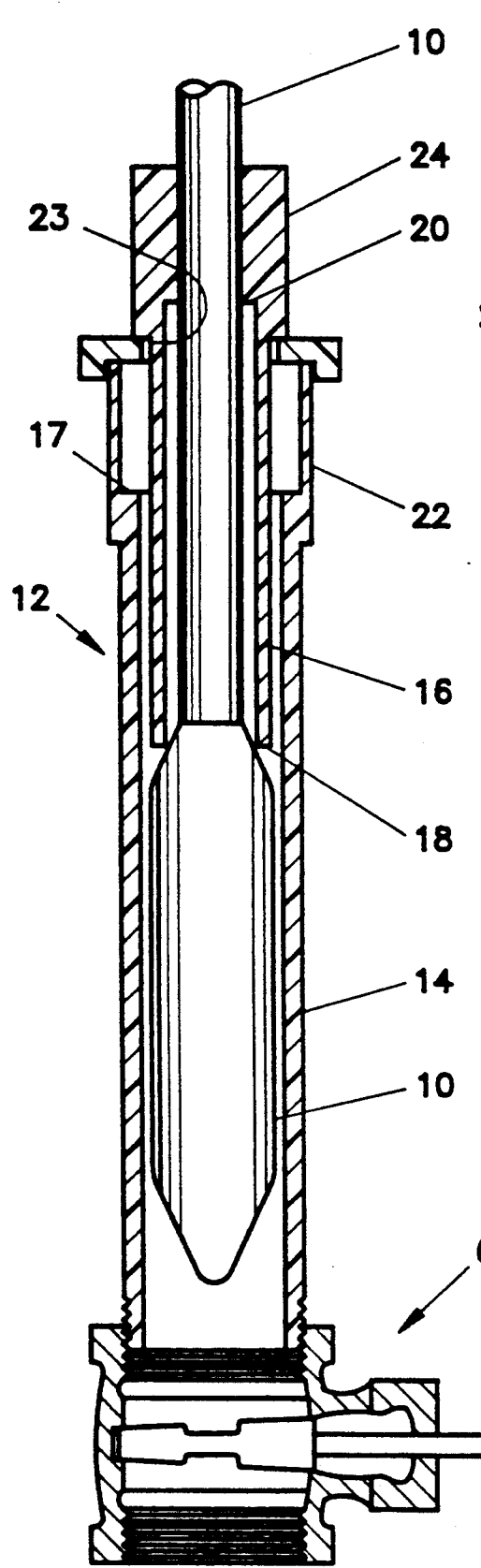
FIG. 3 is a longitudinal cross section of a manually operated apparatus for measuring liquid depth with the pressure transducer in a lower position.

A preferred embodiment of the apparatus of the invention is illustrated in FIG. 3, and comprises a pressure transducer (10) attached to a displacement means (12) in a first submerged position. The displacement means (12) further comprises an outer pipe (14) and an inner piston (16) slidably engaged through the top end (17) of the outer pipe (14). The inner piston (16) has a first end (18) inserted within the outer pipe and holding the pressure transducer (10). The second end (20) of the inner piston (16) extends above the top end (17) of the outer pipe (14). A cap (22) having a hole (23) is placed on the top end (17) of the outer pipe (14) and a bushing (24) is placed on the second end (20) of the inner piston (16) to provide a means of limiting the downward movement of the inner piston (16).

Figure 4:
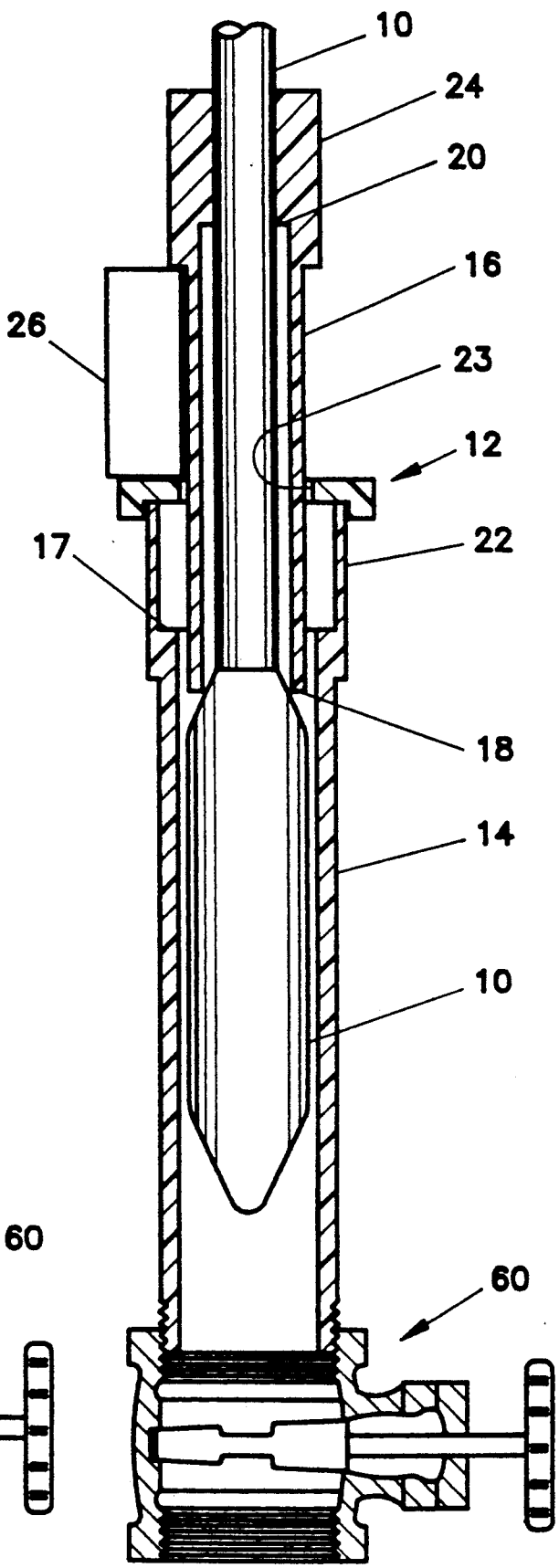
FIG. 4 is a longitudinal cross section of a manually operated apparatus for measuring liquid depth with the pressure transducer in a higher position.

FIG. 4 shows a spacer (26) that may be of any precisely known length so long as combination of the length and accuracy of the length results in a negligible contribution to the uncertainty of the overall measurement. The spacer (26) is placed between the bushing (24) and the cap (22) to vertically place the transducer (10) in a second submerged position.

Figure 5:
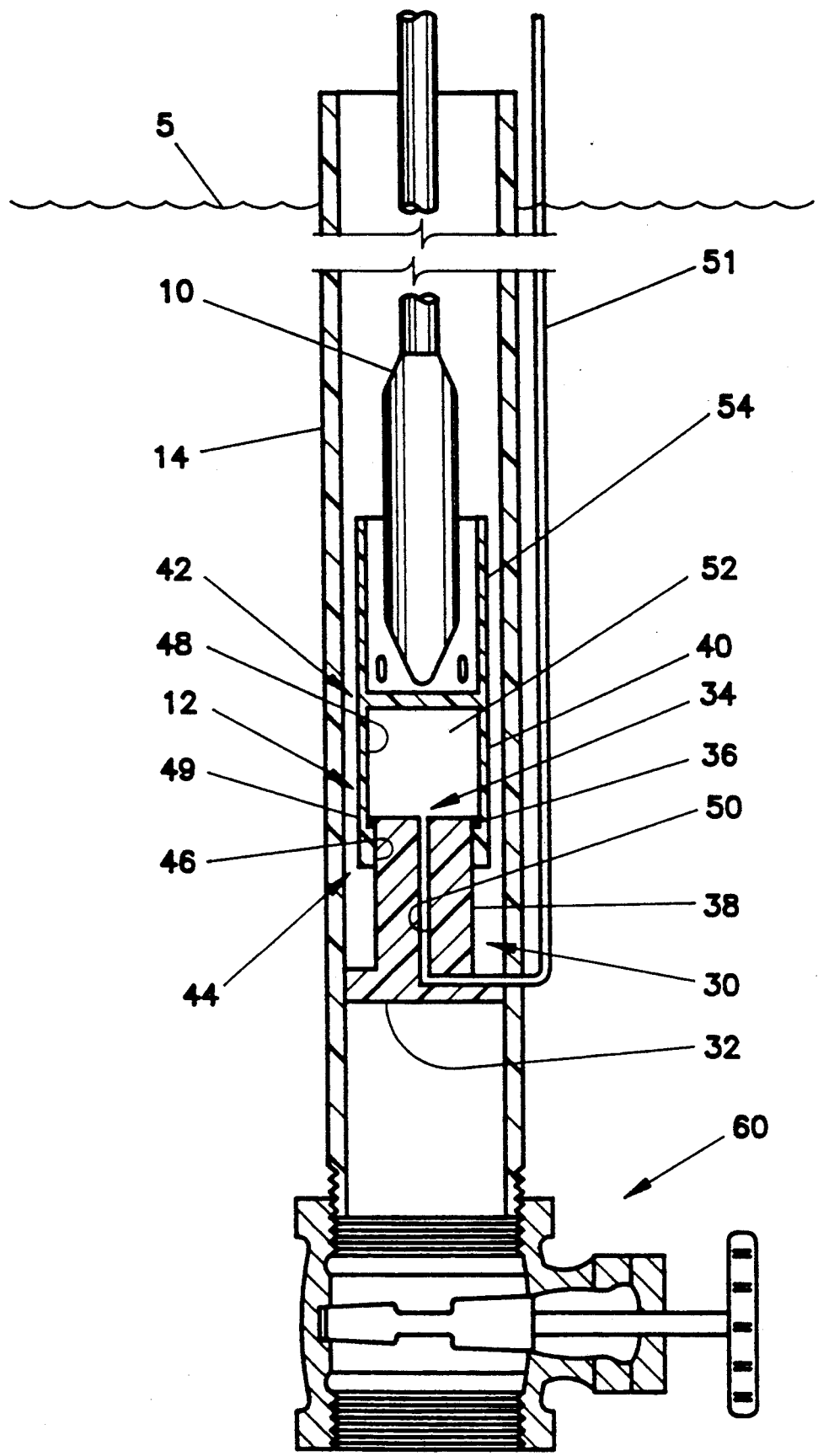
FIG. 5 is a longitudinal cross section of a pneumatically operated apparatus for measuring liquid depth.

A second embodiment is illustrated in FIG. 5. In this embodiment, the displacement means (12) comprises a fixed piston (30) with a first end (32) attached to the outer pipe (14). The outer pipe (14) extends vertically above a liquid surface (5). The second end (34) of the fixed piston (30) has a ring (36) of larger diameter than a central portion (38) of the fixed piston (30). A cylinder (40) having a first end (42) which is closed, and a second end (44), is slidably attached over the second end (34) of the fixed piston (30). The second end (44) of the cylinder (40) has a first section (46) having a diameter slidable upon the central portion (38) of the fixed piston (30), and a second section (48) having a diameter slidable upon the ring (36) with a flat shoulder (49) between the first section (46) and the second section (48). The fixed piston (30) is further provided with a hole (50) for admitting fluid from a tube (51) into a chamber (52) defined by the cylinder (40) and the fixed piston (30). A bracket (54) mounted on the first end (42) of the cylinder (40) holds the pressure transducer (10).

Figure 6:
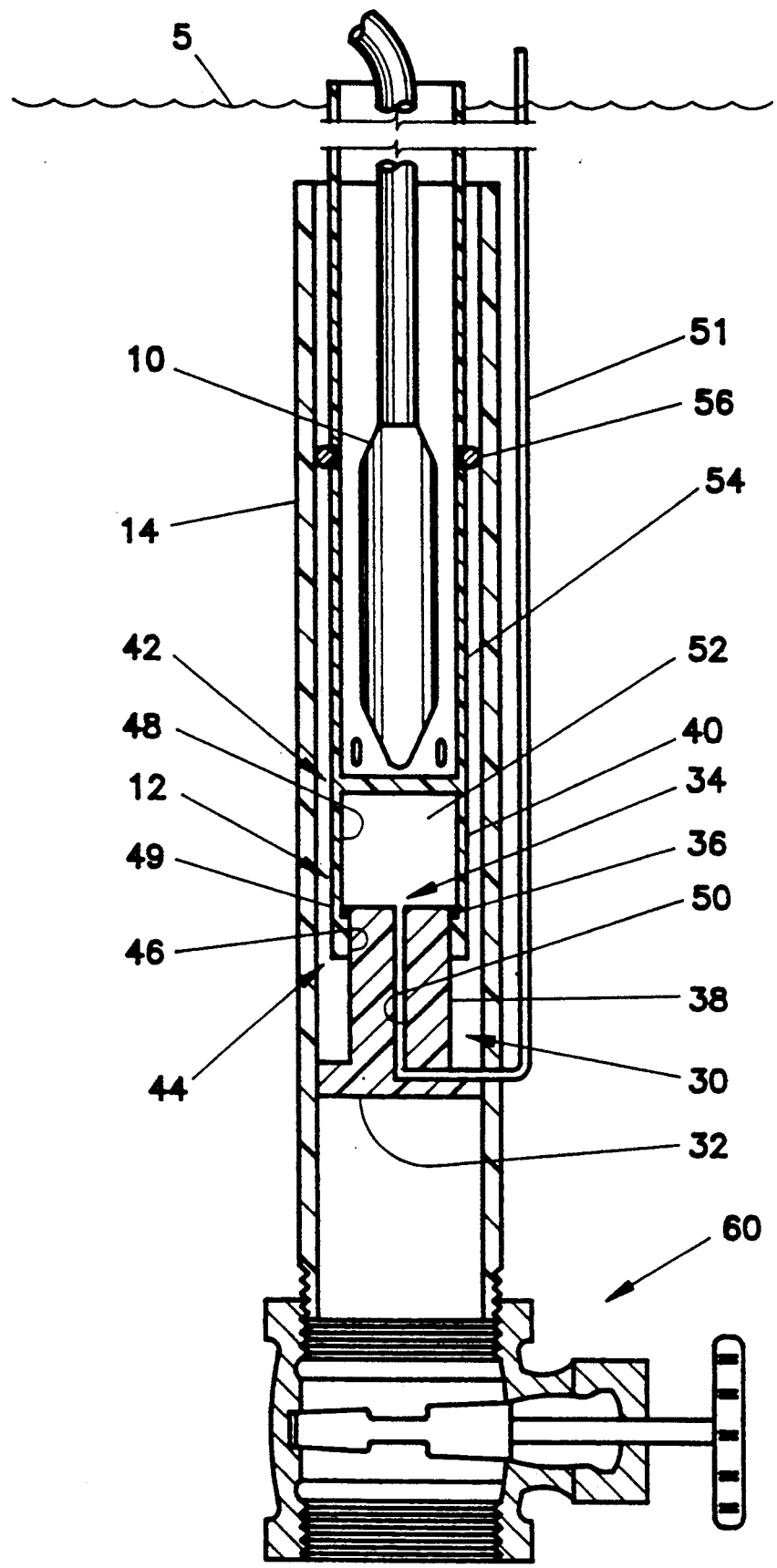
FIG. 6 is a longitudinal cross section variation of FIG. 5, a pneumatically operated apparatus for measuring liquid depth.

A variation of this embodiment is shown in FIG. 6 wherein the outer pipe (14) is fully submerged and the bracket (54) is a pipe extending vertically above the liquid surface (5). A slidable seal (56), for example an o-ring seal, is placed between the outer pipe (14) and the bracket (54) for preventing water from entering the annular volume between the outer pipe (14) and the bracket (54) except from below through the valve (60).

The method of operation of this second embodiment comprises obtaining a first pressure measurement at a first submerged location with the pressure transducer (10) in its lowest position then pressurizing the chamber (52) and raising the pressure transducer until the flat shoulder (49) contacts the ring (36). In this second vertical position, a second pressure measurement is obtained.

The distance between the first end (42) of the cylinder (40) and the flat shoulder (49) may be any length. It is preferred that the combination of the distance and the accuracy of the distance make a negligible contribution to the uncertainty of the overall measurement. In practice, the distance may be from about ½ in. to about 12 in. wherein the length is known to within 0.0001 in.

The pressure measurement to be taken unsubmerged may be accomplished by removing the apparatus from the liquid. Since this may not be desirable, a means for obtaining the unsubmerged pressure measurement is provided. The displacement means (12) and outer pipe (14) are sized so that the free volume within the outer pipe (14) is less than the volume of the displacement means (12). With a valve (60) open, and the displacement means (12) placed in its lower position, the liquid level within the outer pipe (14) will match the fluid level outside the outer pipe (14). The valve (60) is then closed and the displacement means (12) is raised to its upper position. The liquid within the outer pipe (14) falls to fill the space previously occupied by the displacement means (12), and since the volume of fluid within the pipe is less than the volume displaced by the displacement means (12), the pressure transducer (10) is left unsubmerged.

The valve (60) may be of any type including but not limited to manual, electric, or pneumatic.

Figure 7:
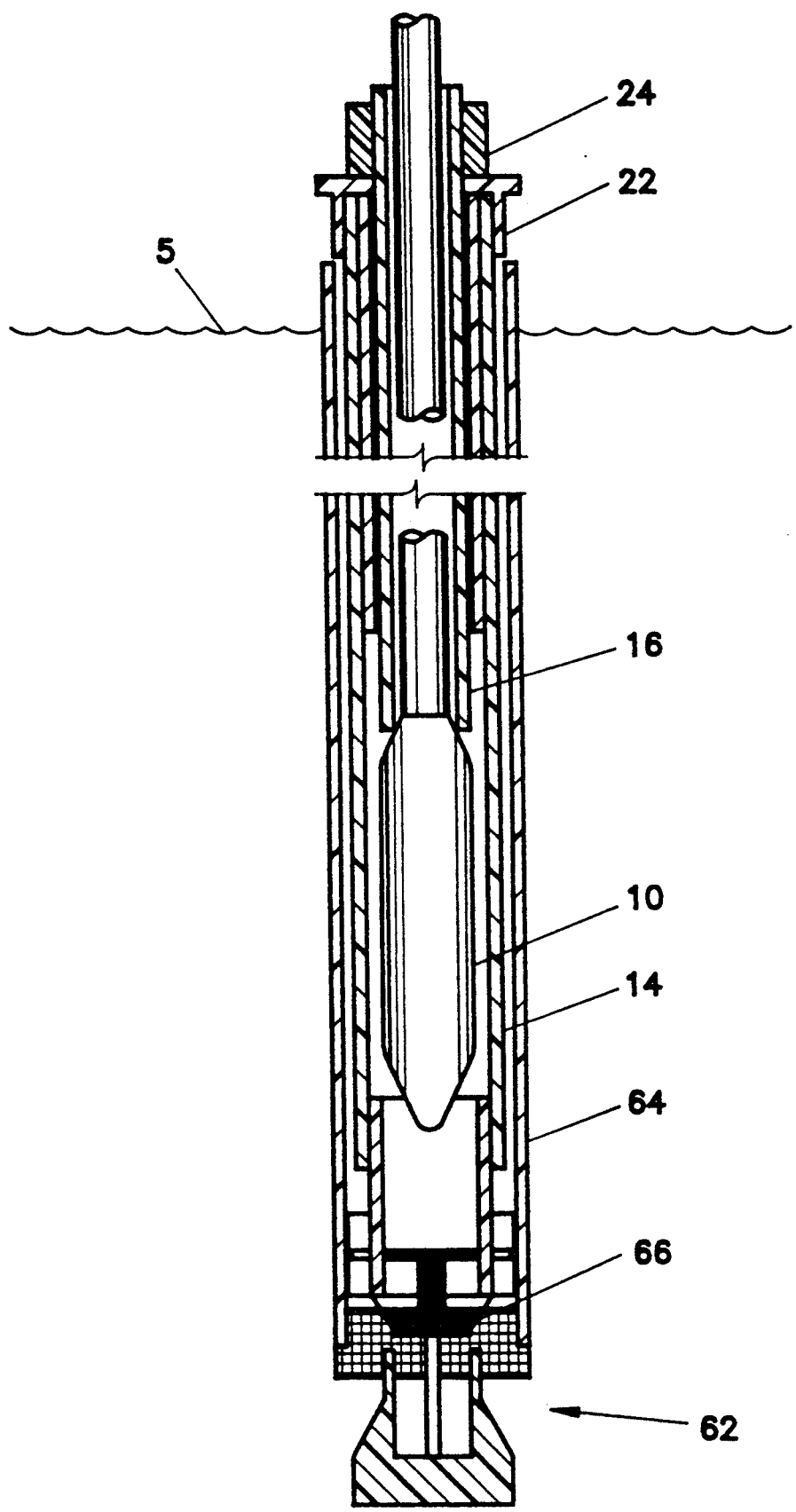
FIG. 7 is a longitudinal cross section of a manually operated apparatus for measuring liquid depth with a means for obtaining in-situ, unsubmerged measurements.

In the case of a manual valve, FIG. 7 illustrates a further embodiment having a remotely operable foot valve (62). An apparatus like the one shown in FIG. 3, may be placed within a sleeve pipe (64) having a foot valve (62) attached at the bottom. The sleeve pipe (64) extends vertically above the liquid surface (5). The actuator (66) of the foot valve (62) may be attached to the bottom of the outer pipe (14). Thus, the foot valve (62) may be actuated by raising and lowering the outer pipe (14).

Figure 8:
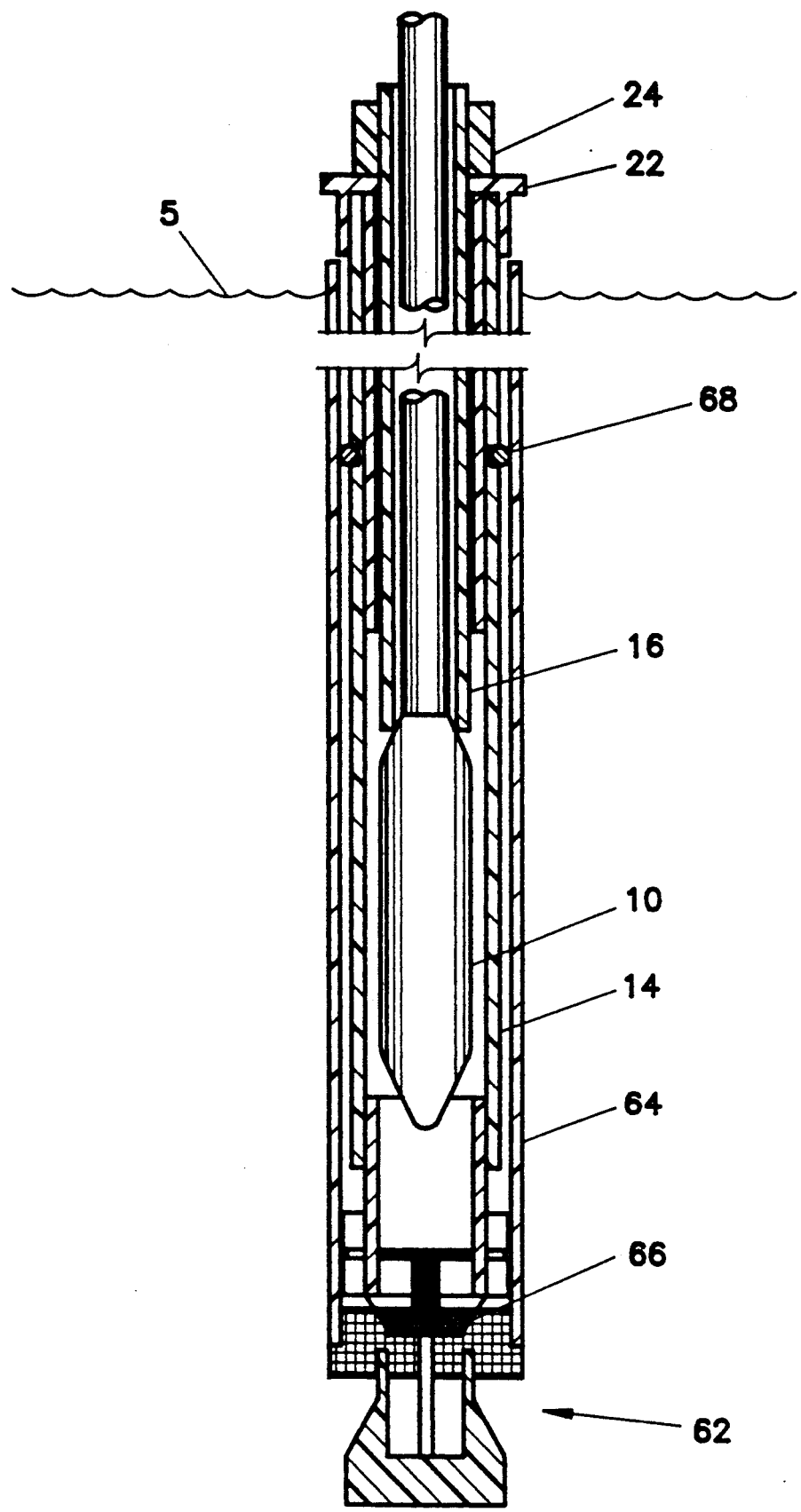
FIG. 8 is a longitudinal cross section variation of FIG. 7, a manually operated apparatus for measuring liquid depth with a means for obtaining in-situ, unsubmerged measurements.

A variation of this embodiment is shown in FIG. 8 wherein the sleeve pipe (64) is fully submerged. A slidable seal (68), for example an o-ring seal, is placed between the sleeve pipe (64) and the outer pipe (14) to prevent water from entering the annular volume between the sleeve pipe (64) and the outer pipe (14) except from below through the foot valve (62).

It will be apparent to those skilled in the art that the displacement may be accomplished by hand or automatically. Automatic displacement may be accomplished using items including but not limited to electrical solenoids, mechanical levers, mechanical drives with torque limiters, mechanical drives with limit switches, and pneumatic or hydraulic drives.

While several preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An apparatus for measuring fluid depth having capability of obtaining a calibration constant, comprising:
   (a) an outer pipe having a first end that is submerged and a second end positioned above a liquid level,
   (b) an inner slidable member with a pressure transducer mounted thereon for obtaining at least a first and a second pressure measurement, said inner slidable member mounted within the outer pipe and permitting vertical displacement of the slidable member and pressure transducer;
   (c) a fixed length piece placed in an interferential relationship with the inner slidable member, thereby permitting making the first pressure measurement at a first location followed by the second pressure measurement at a second location, displaced vertically by the length of the fixed length piece.

2. The apparatus as recited in claim 1, wherein said inner slidable member comprises:
   (a) a cap having a hole, said cap placed on the second end of the outer pipe;
   (b) an inner piston slidably engaged through the second end of the outer pipe and the hole in the cap; and
   (c) a bushing attached to the second end of the inner piston.

3. The apparatus as recited in claim 2, wherein said piece having a fixed length comprises:
   a spacer, said spacer having an interferential relationship to said inner slidable member when set between the cap and the bushing.

4. The apparatus as recited in claim 1, further comprising:
   a valve attached to the first end of the outer pipe.

5. The apparatus as recited in claim 4, wherein
   (a) the valve is a foot valve having an actuator;
   (b) a sleeve pipe is attached at one end to the actuator; and wherein
   (c) the foot valve may be operated by raising and lowering the outer pipe.

6. The apparatus as recited in claim 5, wherein the sleeve pipe extends from the foot valve to above the liquid surface.

7. The apparatus as recited in claim 5, wherein the sleeve pipe extends from the foot valve to below the liquid surface and further comprises:
   a seal placed between the sleeve pipe and the outer pipe to prevent water from entering an annular volume between the sleeve pipe and the outer pipe.

8. The apparatus as recited in claim 1, wherein said fixed length piece comprises:
a fixed piston having first and second ends, and a hole therethrough, the fixed piston first end attached to the outer pipe, the fixed piston second end having a ring.

9. The apparatus as recited in claim 8, wherein said inner slidable member comprises:
(a) a cylinder having first and second ends, said first end closed, said second end having at least two sections of different diameter forming a flat shoulder; and
(b) a bracket on the first end for holding the pressure transducer, wherein;
(c) the cylinder second end is slidably engaged on the fixed piston, and the flat shoulder is bearable against the ring on the fixed piston.

10. An apparatus for measuring fluid depth having capability of obtaining a calibration constant, the apparatus having:
(a) at least one pressure transducer for obtaining a first pressure measurement at a first submerged location, and
(b) at least one displacement device attached to said at least one pressure transducer for obtaining at least one other pressure measurement in at least one other submerged location having a vertical displacement of a precisely known length from the first submerged location, wherein the improvement comprises;
(c) an outer pipe having a first end that is submerged and a second end positioned above a liquid level, said second end having a cap with a hole;
(d) an inner piston slidably engaged through the second end of the outer pipe and the hole in the cap, having a first end inserted within the outer pipe and a second end entending above the second end of the outer pipe;
(e) a bushing attached to the second end of the inner piston; and
(f) a fixed length spacer removably set between the cap and the bushing.

11. An apparatus for measuring fluid depth having capability of obtaining a calibration constant, the apparatus having;
(a) at least one pressure transducer for obtaining a first pressure measurement at a first submerged location; and
(b) at least one displacement device attached to said at least one pressure transducer for obtaining at least one other pressure measurement in at least one other submerged location having a vertical displacement of a precisely known length from the first submerged location, wherein the improvement comprises:
(c) an outer pipe having a first end that is submerged and a second end positioned above a liquid level;
(d) a fixed piston having first and second ends, said first end attached to the outer pipe, said second end having a ring;
(e) a cylinder having first and second ends, said first end closed, said second end slidably engaged with said fixed piston, the second end having at least two sections of different diameter forming a flat shoulder bearable against said ring;
(f) a bracket for holding the pressure transducer; and
(g) a hold in the fixed piston for providing fluid pressure within a chamber defined by the first closed end of the cylinder and the second end of the fixed piston.

* * * * *